3,177,256
METHOD OF PREPARING PARA-AMINOPHENOL
Charles R. Holtzclaw, Mount Holly, and Wilson J. Bryan, Jr., Charlotte, N.C., assignors to Martin Marietta Corporation, a corporation of Maryland
No Drawing. Filed June 1, 1962, Ser. No. 199,251
4 Claims. (Cl. 260—575)

The present invention relates to a method for preparing para-aminophenol, and more particularly to an improved method for preparing para-aminophenol in substantially pure white form.

The method of the present invention is particularly characterized in that it provides an improved, economical, commercially practical method for preparing substantially pure white para-aminophenol.

The method of the present invention is further characterized in that sulfur dioxide is used to acidify an alkaline, aqueous, solution of a salt of para-aminophenol, such as sodium para-aminophenoxide, whereby the sulfur dioxide converts the sodium para-aminophenoxide to para-aminophenol and then to the sulfurous acid salt of para-aminophenol, while at the same time providing a reducing medium to prevent discoloration and oxidation of the para-aminophenol during subsequent processing.

There are a number of prior art methods for producing para-aminophenol, based on the reduction of para-nitrophenol, but all of these methods are subject to disadvantages and limitations. Reduction of para-nitrophenol with iron and acetic acid is unattractive because of difficulties encountered in attempting to remove completely the iron sludge from the product; and reduction by use of tin and hydrochloric acid causes corrosion of equipment and is also too expensive.

Hydrogenation of para-nitrophenol has also been proposed, using platinum or palladium catalyst. Such processes have proven uneconomical because of high catalyst cost and also because para-nitrophenol of very high purity must be utilized to avoid poisoning the catalyst. Nickel catalysts are objectionable because organic solvents, multiple operations, and extremely high pressures must be used; hazard and expense are the primary objections.

Aside from the foregoing disadvantages and limitations, the para-aminophenol produced by all prior art methods in commercial use is in a partially oxidized and partially discolored condition, and is highly sensitive to further oxidation and discoloration.

According to the method of the present invention we have overcome the above disadvantages and limitations of the prior art as follows. Generally speaking, the method of the present invention comprises preparing substantially pure white para-aminophenol by reducing a member selected from the group consisting of alkali metal salt of para-nitrophenol and alkali metal salt of para-nitrosophenol, such as sodium para-nitrophenoxide or sodium para-nitrosophenoxide, with an alkaline aqueous reducing solution to form an aqueous alkaline solution of the corresponding alkali metal salt of para-aminophenol, such as sodium para-aminophenoxide, acidifying the solution with sulfur dioxide to produce a solution of the sulfurous acid salt of para-aminophenol, clarifying the solution with charcoal, adding alkali until the solution is only slightly acid at which point the para-aminophenol is precipitated, and isolating and drying the resulting substantially pure white para-aminophenol.

Accordingly, either para-nitrochlorobenzene or para-nitrosophenol may be used as the starting reactant to synthesize the para-aminophenol, as both produce an aqueous alkaline solution of an alkali metal salt of para-aminophenol, such as sodium para-aminophenoxide, which is subsequently treated with sulfur dioxide, etc, as above.

When para-nitrochlorobenzene is used as the starting reactant, it is subjected to an aqueous alkali treatment and forms sodium para-nitrophenoxide, which is then reduced to sodium para-aminophenoxide.

When para-nitrosophenol is used as the starting reactant, it is subjected to treatment by an aqueous reducing agent and alkali, and the alkali converts the para-nitrosophenol to a transitory sodium para-nitrosophenoxide which is promptly reduced to sodium para-aminophenoxide.

The above method provides, among others, the following advantages. The sulfur dioxide protects the reduction mass and resulting final product from oxidation, decomposition, discoloration and darkening, while at the same time providing the required acidity. This is not possible with the mineral acids customarily used in prior art processes, as they do not protect the reduction mass or the final product from oxidation and discoloration. Moreover, the salts which are produced on acidification with sulfur dioxide in the method of the present invention are primarily sodium sulfite and sodium bisulfite, in solution, which are easily separated from the final product by subsequent filtration. Free sulfur is not produced by the method of the present invention. This is in marked contrast to prior art methods in which certain minerals acids are used and in which relatively insoluble free sulfur and difficulty soluble salts are produced.

Para-aminophenol is a highly important intermediate used in the manufacture of certain dyestuffs, anti-oxidants, photographic chemicals, oil additives and other commercial products, in which the high quality and low cost of the para-aminophenol are of great importance. It has been found that the process of the present invention overcomes the disadvantages and limitations of the prior art processes in that para-aminophenol is produced in substantially pure white form, with an assay value of more than 99.0% and with an ash content of less than 0.5%.

The process has the additional advantage of substantial cost savings over prior processes. Some of the factors contributing to cost saving are that low pressure reactors and other conventional equipment readily available in most chemical plants may be utilized. It is surprising that the process of the present invention permits the use of relatively inexpensive commercial grade para-nitrochlorobenzene or para-nitrosophenol as the starting material, and yet results in substantially pure white para-aminophenol as the final product. This is in sharp contrast to prior processes, based on the reduction of para-nitrophenol, which require relatively pure and expensive para-nitrophenol as the starting material.

Other advantages of the method of our invention will become apparent from the following non-limiting and illustrative examples of embodiments of the invention.

*Example I*

Sodium para-nitrophenoxide is prepared by charging 157.6 lbs. of para-nitrochlorobenzene, 183.5 lbs. of 50% aqueous NaOH, and 720 lbs. of water into a closed reactor. The solution is heated to 150° C. The temperature of the solution is raised evenly from 150° C. to 160° C. over a period of three hours, and then the solution is heated for an additional six hours at 160° C. All of the above heating is under a pressure of 60–75 p.s.i.g. and preferably about 65–70 p.s.i.g. The reaction should be complete at this point, but a sample may be taken and checked for unreacted para-nitrochlorobenzene. If any unreacted para-nitrochlorobenzene is present, the temperature may be maintained at 160° C. for a longer period of time to allow completion of the reaction.

For convenience, the hot solution is then transferred through a clarification filter to a second reactor to remove any insolubles, such as iron compounds present as impurity. This filtration step is optional, only being required when foreign matter is present.

The sodium para-nitrophenoxide is next reduced to sodium para-aminophenoxide with a reducing agent. This may be done by cooling the hot solution in a second reactor to below the boil, preferably to about 80° C., and adding thereto 222 lbs. of 43% aqueous sodium hydrosulfide. The reactor is then closed and the solution is heated at 130°–135° C. under a pressure of 30–40 p.s.i.g. for one hour; thereafter the temperature is elevated to 140–165° C. and preferably to 150–155° C., at which temperature the solution is heated under a pressure of 55–65 p.s.i.g., and preferably about 60 p.s.i.g., until reduction appears complete and for thirty minutes thereafter. Reduction customarily appears complete after the solution has been held at 150°–155° C. for about two to four hours. Completion of the reduction may be determined by spotting a drop of the solution on white filter paper; a non-yellow run-out indicates that reduction is more than 95% complete.

The sodium para-aminophenoxide is converted to para-aminophenol and then to the sulfurous acid salt of para-aminophenol as follows. The alkaline, aqueous solution of sodium para-aminophenoxide is cooled externally from 150°–155° C. to about 25°–50° C. When the solution has cooled to 110° C., and is under 5–10 p.s.i.g. pressure, liquid sulfur dioxide is added to the solution by being piped into the closed reactor above the surface of the solution as cooling continues; enough sulfur dioxide is added to bring the pH of the solution within the range of pH 2–4, and preferably to pH 3.0; this is the optimum pH for subsequent treatment with activated charcoal. A total of about 160 lbs. of sulfur dioxide is required to bring the pH within this range. Although we prefer to use liquid sulfur dioxide because less time is required for its addition, it will be understood that sulfur dioxide gas works as well.

To prevent oxidation, the process should be carried out in a closed system from the time the reducing agent is added until after the sulfur dioxide has been added.

Following the completion of the addition of the sulfur dioxide, approximately three pounds of activated charcoal is added to the solution without allowing the excess sulfur dioxide to escape. The charcoal containing solution is heated in a closed reactor for one hour at 70°–90° C., and preferably 80° C. and then is clarified by passing the solution and charcoal through a closed clarification filter, where the charcoal and other insolubles are extracted. The filtrate is saved.

The filtrate is diluted with water until the concentration of the sulfurous acid salt of para-aminophenol is 5–10% by weight of the filtrate, and preferably 75%, to put the salts in solution for subsequent removal. Dilution to 7% concentration produces a product with less than 0.5% ash. High concentrations of the sulfurous acid salt result in increased ash content, and lower concentration of the sulfurous acid salt result in increased loss of yield. Seven hundred pounds of water is added to the filtrate to adjust the concentration of the sulfurous acid salt of para-aminophenol to 7% by weight. This may be done by adding the water directly to the filtrate or by washing it through the filter containing the charcoal and other insolubles and adding the wash water to the filtrate. We prefer to add 500 lbs. of the water directly to the filtrate and to wash the remaining 200 lbs. of water through the filter prior to adding it to the filtrate. The water should be at a temperature of about 50°–90° C.

The para-aminophenol is precipitated from the above filtrate by addition thereto of alkali, with stirring, until the pH is raised to pH 6.0–6.9, and preferably to 6.5. The pH is important because if adjusted to the alkaline side the product discolors, and if not adjusted to at least 6.0, there is considerable loss of yield of para-aminophenol because some of it is not converted from the soluble sulfurous acid salt of para-aminophenol. The precipitation may be accomplished by adjusting the temperature of the filtrate to 50°–95° C., and preferably to 80° C. to obtain optimum crystal size, and adding thereto 67 lbs. of 50% aqueous NaOH and then adding 40 lbs. of soda ash ($Na_2CO_3$). The resulting slurry is cooled to 30° C. and allowed to stand for one hour thereafter to permit precipitation of the para-aminophenol crystals.

The precipitated para-aminophenol is next separated from the filtrate and washed. We prefer to isolate the para-aminophenol by centrifugation, as essentially all of the filtrate is removed by this method. The filtrate is discarded. The para-aminophenol crystals remaining in the centrifuge basket are washed with 100 lbs. of a 1% aqueous solution of sodium bisulfite at 20°–25° C., and the wash solution discarded. The aqueous bisulfite serves to wash away all remaining filtrate from the para-aminophenol. Centrifugation is continued for about ten minutes, until the moisture content of the para-aminophenol is about 10–15% by weight. It will be understood that other agents, such as sodium sulfite or sodium hydrosulfite, may be used instead of sodium bisulfite in the washing operation.

The para-aminophenol is then dried to substantial dryness immediately. Drying to moisture content of less than 0.1% may be accomplished by heating the para-aminophenol in a vacuum drier, for six hours at 50°–55° C. and at 27–29 inches mercury vacuum and thereafter for eight more hours at 70°–75° C. and at 27–29 inches mercury vacuum.

The above process yields from 78 to 89 lbs. of substantially pure white para-aminophenol, which represents 72–82% of theoretical yield. The para-aminophenol produced by the above method may be allowed to stand uncovered in a room for a week or two without discoloration.

*Example II*

Transitory sodium para-nitrosophenoxide, which is promptly reduced to sodium para-aminophenoxide, is formed by charging 151 lbs. of 43% sodium hydrosulfide, 86 lbs. of 50% aqueous NaOH, and 1100 lbs. of water into a reactor, stirring at 45° C. for 15 minutes, and then adding 123.1 lbs. of para-nitrosophenol evenly with stirring during 1½ hours, while the solution is maintained at 45–50° C., and thereafter stirring 30 more minutes at 50° C.

The sodium para-aminophenoxide is converted to para-aminophenol and then to the sulfurous acid salt of para-aminophenol by adding liquid sulfur dioxide to the above alkaline aqueous solution of sodium para-aminophenoxide, in a closed reactor, until the pH of the solution reaches 2–4, and preferably pH 3.0; about 135 lbs. of sulfur dioxide is required to reach this pH range.

Following the completion of the addition of the sulfur dioxide, the remaining steps of the method of this example, e.g., charcoal treatment, clarification, dilution of the filtrate, precipitation of para-aminophenol with alkali, separation, washing and drying, are the same as in Example I above, except that the filtrate is preferably diluted to 8.5% sulfurous acid salt of para-aminophenol concentration rather than to 7% as specified in Example I, the addition of 170 lbs. of water being used to effect the dilution rather than the 700 lbs. specified in Example I.

The process of Example II yields from 78 to 89 lbs. of substantially pure white para-aminophenol, which represents 72–82% of theoretical yield. The para-aminophenol thus produced may be allowed to stand uncovered in a room for a week or two without discoloration.

In order to prevent discoloration for longer periods, the dry para-aminophenol may be packaged in a non-air transmitting container and sulfur dioxide gas introduced into the container to replace the air space, after which the container is closed. Although we prefer to use a non-light-transmitting container, we have found that para-aminophenol may be stored in a closed, clear, transparent, glass container, or sealed in a clear plastic bag, in which sulfur dioxide gas has replaced the air space, and that the container may be left in a lighted room for more than six months without discoloration of the para-aminophenol. Any non-air-transmitting container, such as glass, wood, plastic, treated paperboard, etc. may be utilized for packaging the para-aminophenol.

Sulfur dioxide gas is particularly suitable for use in packaging and stabilizing the resulting para-aminophenol, only small quantities are required, it is not toxic in the quantities used, it is relatively inexpensive, it is heavier than air which assists in preventing its escape from the container, it has a characteristic odor which renders its presence easily identifiable, and most importantly, it does not react chemically with dry para-aminophenol and is separated from the para-aminophenol by diffusion into the atmosphere when the product is removed from the package.

Our invention is not limited other than as defined in the following claims.

We claim:

1. A method for preparing para-aminophenol comprising the steps of heating a composition comprising para-nitrochlorobenzene, sodium hydroxide and water for three hours at 150°–160° C. and 60–75 p.s.i.g. pressure and then for six hours at 160° C. and 60–75 p.s.i.g. pressure; filtering the resulting hot solution; cooling the filtrate below the boil and adding thereto sodium hydrosulfide; heating the hydrosulfide containing filtrate in a closed container for one hour at 130°–135° C. and 30–40 p.s.i.g. pressure and thereafter heating for 2–4½ hours at 140°–165° C. and 40–65 p.s.i.g. pressure; cooling the resulting solution to 110° C.; adding to the solution while it is in a closed system and as cooling continues enough sulfur dioxide to adjust the pH to 2–4; adding activated charcoal to the solution; heating the charcoal containing solution in a closed system for one hour at 70°–90° C.; extracting the charcoal and other insolubles from the solution; diluting the resulting solution with water to 5–10% by weight concentration of sulfurous acid salt of para-aminophenol; adjusting the temperature of the solution to 50°–95° C. and adding thereto first NaOH and then soda ash until the pH becomes 6.0–6.9; cooling the resulting slurry to 30° C. and allowing it to stand while para-aminophenol precipitates therefrom; isolating the para-aminophenol; washing the para-aminophenol with aqueous sodium bisulfite; and drying the para-aminophenol under vacuum.

2. A method for producing para-aminophenol comprising the steps of a converting para-nitrochlorobenzene to sodium para-nitrophenoxide by reacting said para-nitrochlorobenzene with aqueous sodium hydroxide, reducing the sodium para-nitrophenoxide to sodium para-aminophenoxide in a solution of sodium hydrosulfide, adding sulfur dioxide to the solution to acidify it, adding alkali to the acid solution to adjust the pH to 6.0–6.9 and thereby precipitating para-aminophenol, and thereafter isolating and drying the para-aminophenol.

3. A method for producing para-aminophenol comprising the steps of converting para-nitrochlorobenzene to a sodium para-nitrophenoxide solution by reacting said para-nitrochlorobenzene with aqueous sodium hydroxide under heat and pressure, filtering the sodium para-nitrophenoxide solution, reducing the sodium para-nitrophenoxide in solution with aqueous sodium hydrosulfide, adding sulfur dioxide to the resulting solution to acidify it, heating the acidified solution with activated charcoal, separating the charcoal from the solution, adjusting the pH of the solution to 6.0–6.9 and thereby precipitating para-aminophenol, and isolating and drying the para-aminophenol.

4. A method for preparing para-aminophenol comprising the steps of heating a composition comprising para-nitrochlorobenzene, sodium hydroxide and water to form an aqueous solution of sodium para-nitrophenoxide; filtering said solution to remove insolubles; adding sodium hydrosulfide to the resulting filtrate; heating the hydrosulfide containing filtrate to produce sodium para-aminophenoxide in solution; adding sulfur dioxide to the sodium para-aminophenoxide solution until the pH is adjusted to 2–4 to form a solution of the sulfurous acid salt of para-aminophenol; adding activated charcoal to said salt solution; heating said charcoal containing salt solution; separating the charcoal from said salt solution; adding sodium hydroxide and soda ash to said salt solution until the pH reaches 6.0–6.9 and thereby precipitating para-aminophenol; centrifuging the para-aminophenol; washing the para-aminophenol with aqueous sodium bisulfite; and drying the para-aminophenol under vacuum.

References Cited in the file of this patent

UNITED STATES PATENTS

| 2,035,502 | Ostromislensky et al. | Mar. 31, 1936 |
| 2,035,510 | Semenoff | Mar. 31, 1936 |
| 2,464,194 | Zimmerman | Mar. 8, 1949 |
| 2,521,425 | Thompson | Sept. 5, 1950 |

FOREIGN PATENTS

| 95,755 | Germany | Dec. 23, 1897 |

OTHER REFERENCES

Wein: "Color Trade Journal," vol. 3, pages 287–88 (1918).